_United States Patent Office_

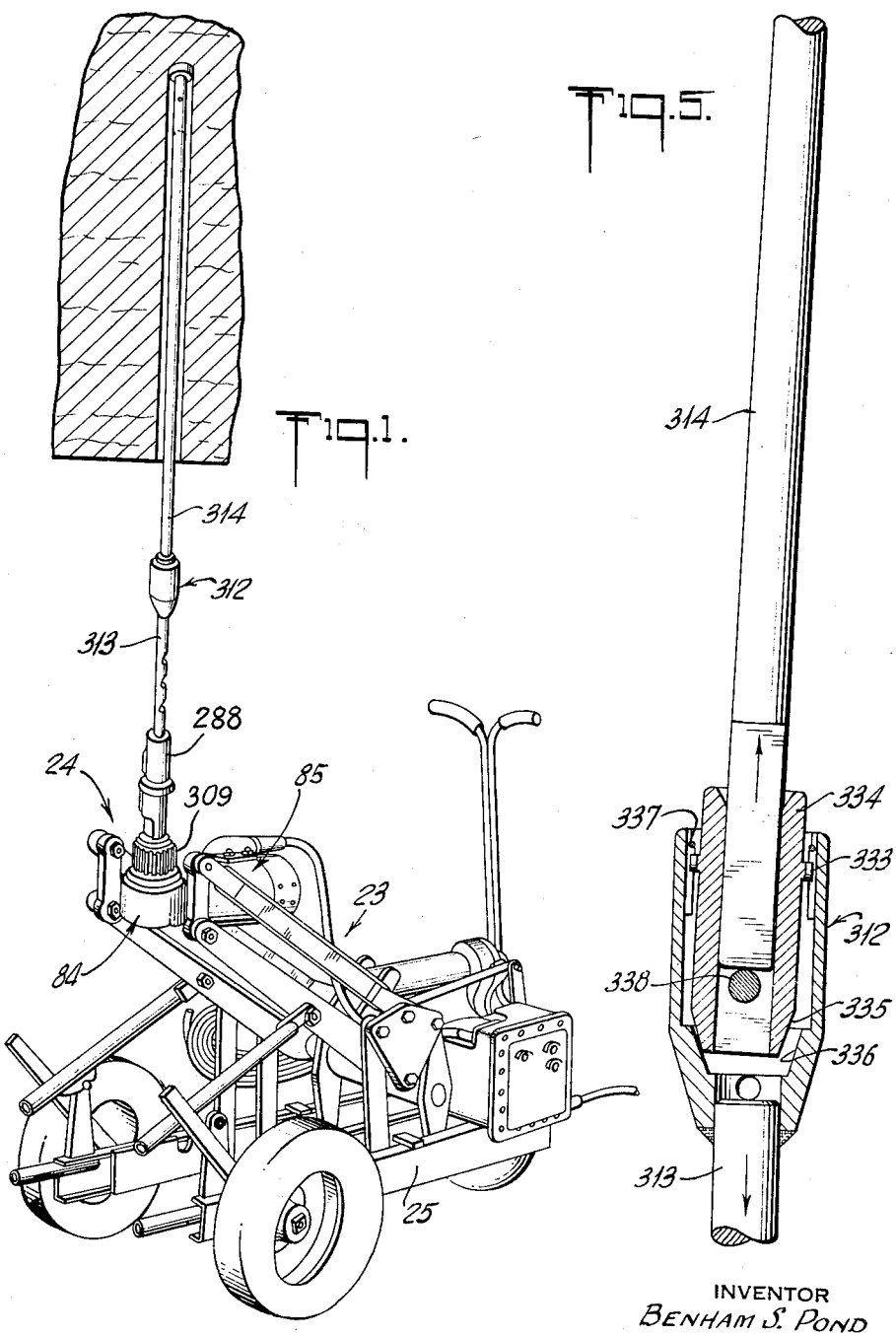

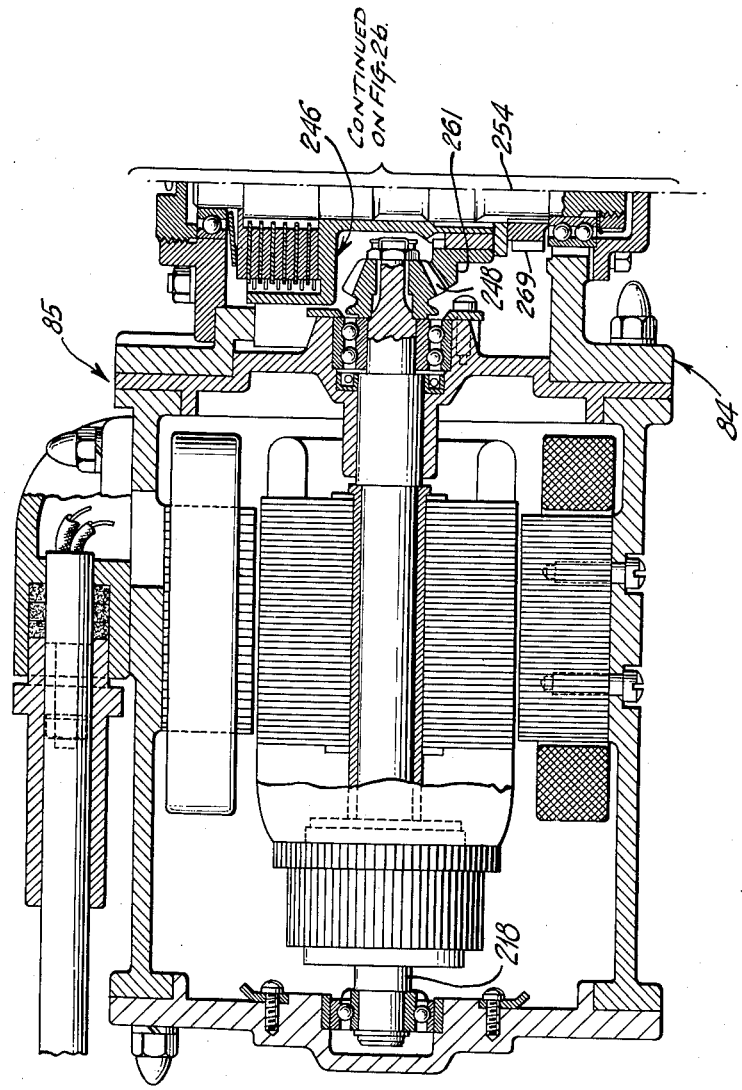

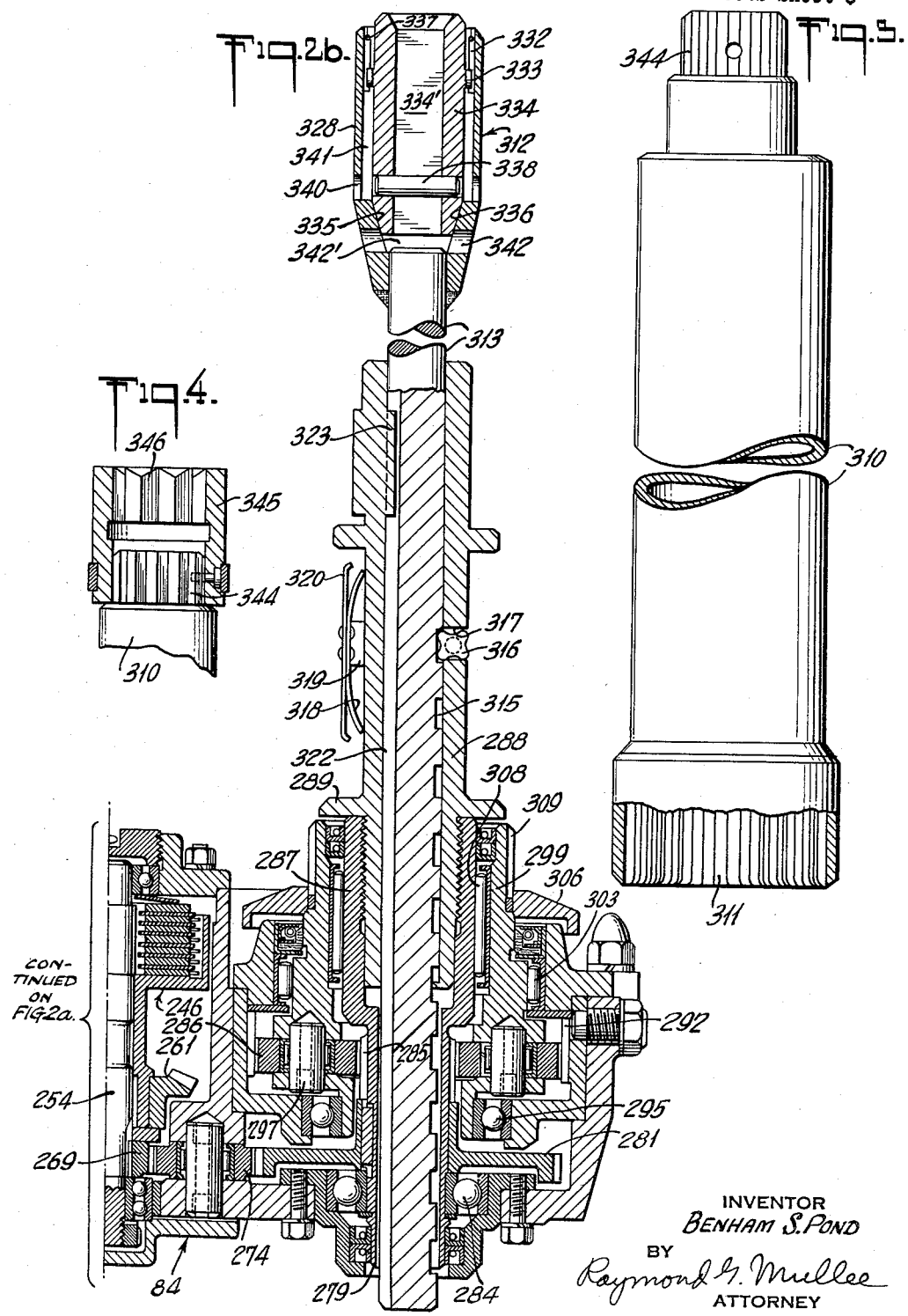

3,014,543
Patented Dec. 26, 1961

3,014,543
ROOF BOLTING DRILL CHUCK ASSEMBLY
Benham S. Pond, Clinton, N.Y., assignor to Chicago Pneumatic Tool Company, New York, N.Y., a corporation of New Jersey
Original application June 6, 1952, Ser. No. 292,064, now Patent No. 2,771,273, dated Nov. 20, 1956. Divided and this application Sept. 28, 1956, Ser. No. 612,773
8 Claims. (Cl. 175—170)

This application is a division of my pending application bearing Serial Number 292,064, and filed June 6, 1952, for a Roof Bolting Drill, and issued November 20, 1956 as Patent No. 2,771,273.

This application is directed to a novel and improved drill chuck assembly in a roof bolting drill that is of particular advantage in operations for bolting the roofs of mine tunnels and the like.

A general object of this invention is to provide a drill chuck assembly of an efficient and practical nature for effecting roof bolting operations in the roofs of mine tunnels and the like.

Another object of this invention is to provide in a drill chuck assembly for this purpose a drill chuck arrangement wherein the drill chuck may be raised or lowered as desired to a selected height.

A further object of this invention is to provide practical and efficient means for releasably locking the drill chuck in any selected height adjustment thereof.

Another object of this invention is to provide a drill chuck socket structure wherein the shank of a drill or auger received in the socket will not freeze or bind to the chuck during drilling operations, particularly when the drill has deviated from center.

The invention further lies in the particular construction and arrangement of its several component parts, as well as in their cooperative association with one another to effect the results intended.

The foregoing objects and other advantages of the invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

In the drawings:

FIG. 1 is a pictorial perspective view showing a roof bolting drill embodying the invention;

FIG. 2a is a longitudinal section through the power drive mechanism of the drill chuck assembly;

FIG. 2b is a continuation of FIG. 2a, and shows a vertical section through the drill chuck assembly;

FIG. 3 is an elevational view of a bolt setting sleeve adapted to sleeve over the chuck assembly;

FIG. 4 is a cross-section of a bolt setting socket associated with the sleeve member; and FIG. 5 is a sectional view of the drill chuck wherein the inner member thereof is lifted from the seat of the outer member and is tilted to permit the drill shank to be freed from the chuck.

In describing the invention in further detail, reference is directed to the drawings wherein there is disclosed (FIG. 1) a wheeled carriage frame 25 on which the drill chuck assembly, generally designated 24, of the present invention is mounted. The carriage frame includes suitable power driven mechanism 23 that serves to vertically elevate or lower the drill chuck assembly as needed during operations relative to the roof of the mine.

The drill chuck assembly (FIGS. 2a, 2b) includes a general housing 84 supporting a suitable motor 85 having a drive shaft 218 which drives, through beveled gearing 248, 261 and a disc type slip clutch 246, a stub shaft 254. The latter is engaged to drive, through gearing 269, 274 and a relatively large gear 281, an inner vertically disposed hollow spindle member 279. The latter is supported for rotation in suitably supported bearings 284 and 308. Spindle 279 drives through a sun gear 285 thereon planetary gearing 286. The latter engage, as they rotate, a surrounding fixed ring gear 292, and carry trunnions 297 on which is mounted for rotation as a unit with the planetary gearing an outer spindle 299. The latter, suitably supported for rotation on suitably supported bearings 295, 303, and 308, is concentric with the inner spindle. Due to the relatively large drive gear 281, the inner spindle is caused to rotate relatively faster than the outer spindle. This relative speed of operation is desired according to the respective functions of each spindle: the faster rotating inner spindle being designed to drive a drill chuck 312 for boring operations, while the slower rotating outer spindle is designed to drive a bolt setting tool 310 (FIGS. 3, 4).

The inner spindle is hollow through, opening out at both ends. The upper end thereof provides an internally threaded enlargement 287 in which the lower end of an extension sleeve 288 is threadedly engaged. The latter has a flange 289 that is tightened up against the end wall of the inner spindle 279 so as to bind the two for rotation as a unit. The extension member sleeves an elongated shank portion 313 which depends from the lower end of the drill chuck 312. A key 323, formed on the inner wall of the extension sleeve, engages in a keyway 322 formed lengthwise of the chuck shank 313; whereby the latter is guided for vertical slidable movement in the sleeve member, and is rotatable together with the latter as a unit. The chuck shank is slidable through the extension sleeve and through the inner spindle. The latter opens through its bottom end so as to permit projection therethrough of the lower end of the drill chuck shank as the latter is lowered. By this arrangement a drill chuck shank of relatively increased length may be utilized, and as a consequence, the extent to which the attached chuck may be elevated is increased.

The drill chuck 312 is mounted to the upper end of shank 313, and provides a suitable socket 334' to receive the complementary shank end of a drill or auger member 314 (FIGS. 1, 5). Means is provided to permit adjustment of the drill chuck shank in its sleeve to a desired height and to releasably lock it in such position. This permits the drill 314 carried in the drill chuck to be elevated as desired to compensate for irregularities and variations in the height of the mine roof and to make up for that part of the drill lost in the chuck. It further serves to reduce the number of various drill lengths required in a proposed roof drilling operation. In this respect, the drill chuck shank has a series of vertically spaced notches 315 of rectangular formation. These are adapted to successively register, accordingly as the shank member 313 is raised or lowered in the sleeve extension, with a complementary slot opening 317 formed transversely through the periphery of the wall of the extension sleeve. Laterally disposed in slot 317 is an elongated key or lug 316 of square cross-section. This key is normally biased inwardly of slot 317 by suitable spring means. The latter comprises a horizontally disposed U-spring 319, the arms of which extend about opposite sides of sleeve member 288 and are fixed at their free ends to opposite ends of key 316. The back or bridge of spring 319 is fixed centrally of a vertically disposed bow spring 318 which limits at its ends against the surface of sleeve member 288. By this structure, the key member is normally drawn inwardly of slot 317, and the inner portion of the key is drawn into any one of the notches 315 that may then be in register therewith. The thickness of the key and the depth of a notch 315 are such that the inner portion of the key will fill the notch while the balance of the key will project into slot 317, whereby the drill chuck shank will be locked against further movement until the key is released. Key 316 may be released from a notch 315 in which it is engaged so as to permit further upward or downward adjustment of the drill chuck shank. This is accomplished by manually depressing the bow spring 318 sufficiently to move the key member 316 out of the registering notch. A vertically disposed stop bar 320, fixed to the back of the bow spring and having inturned ends, serves as a base for exerting pressure on the bow spring to depress the latter; and it also serves to limit the extent of outward movement of the key element so as to prevent escape of the latter from slot 317 of the extension sleeve.

On occasion during roof drilling operations, a starting hole in the roof of the tunnel may run off center from the vertical drilling axis of the tool. This may be occasioned by some inherent play in the shank of the drill chuck, in the spindle assembly, or in the elevating structure 23. Such an off centered hole would cause slight bending in the shank of the drill, particularly a long drill, and consequent binding of the drill shank in a conventional type one-piece chuck socket. However, due to the particular construction of the drill chuck 312 of the present invention, such binding difficulties do not take place.

Here, a two-piece drill chuck is provided (FIG. 2b). It comprises an outer member 328 having a tapered and thickened lower end which is fixed, as by welding, to the upper end of the drill chuck shank 313. The upper end of member 328 is internally splined, as at 332. The latter splines engage short spline formations 333 of an inner member 334. The latter has a square socket 334' for accommodating the complementary end of the shank of a drill member 314. The spline formations 332 are long, while the spline formations 333 are shorter so as to permit the inner member 334 to be elevated in the outer member. The splines of the inner and outer members are loosely engaged, so that the inner member may be tilted in the former when the inner member is elevated. The inner member 334 has a truncated tapered end 335 which normally seats on a complementary tapered seat 336 formed in the outer member, and may be lifted therefrom. This structure permits the inner chuck member, when lifted from the seat of the outer member, to adapt itself to the direction of the shank of the drill member 314. By this structure, the drill chuck can be made free and lowered from the shank of the drill member, or the latter may be elevated free of the drill chuck. Upon lowering the drill chuck, this release of the chuck from the shank of the drill will be automatically effected.

The inner chuck member 334 is prevented from leaving the outer member by engagement of the spline formations 333 thereof with a retaining ring 337 disposed in the upper end of the outer chuck member. The amount of elevated movement permitted, however, is sufficient to allow the tapered lower end 335 of the inner chuck member to be lifted from its seat and shifted some distance laterally (FIG. 5).

A pin 338, transversely of the lower end of the inner chuck member and supported in opposite wall portions of the latter, serves as a rest for the end of a drill shank received in the chuck socket. When the inner member 334 is fully seated in the outer member 328, a space 342' is provided between its truncated end and the bottom of the outer member. The socket 334' of the inner member opens around the transverse pin and out through the bottom to communicate with space 342'. The latter communicates with transverse openings 342 through the lower end of the outer chuck member, whereby dirt entering the chuck socket will drop into space 342' and may be blown out through the openings 342. The outer member 328 has lateral openings 340 permitting discharge of dirt entering down into the space 341 between the chuck members.

The adjustable nature of the drill chuck shank 313 has other advantages besides those mentioned. It enables the outer spindle 299 to drive the bolt setting tool 310, earlier mentioned, so as to rotate and tighten a bolt fitted into a boring previously made by the drilling tool. The bolt setting tool 310 (FIG. 3) is an elongated sleeve which slips freely over the drill chuck 312 and the inner spindle extension 288, when the chuck shank 313 has been adjusted to its lowermost position. The bottom end wall of sleeve 310 is adapted to rest upon an apron ring 306 fitted to the outer spindle; while splines 311 formed internally of the lower end of the sleeve are adapted to engage splines 309 of the outer spindle; whereby rotation of the outer spindle drives the bolt setting sleeve 310.

The latter sleeve is of sufficient diameter and height so that, when mounted upon the outer spindle, it will clear the structure of the drill chuck 312 and the extension 288 and will rotate clear of the latter elements.

An adapter 345 (FIG. 4), engageable by internal splines thereof with complementary splines 344 about the upper end of sleeve 310, provides a socket 346 to accommodate the head of a roofing bolt; whereby rotation of sleeve 310 by the outer spindle 299 will set and tighten the bolt in its hole.

It is plain that excessive torque developing in either a roof drilling or in a bolt tightening operation will cause clutch 246 to slip, whereby the associated elements of the drill chuck assembly will be protected against strain and otherwise possible damage.

While an embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art; and it is my intent, therefore, to claim the invention not only as shown and described, but also in all such forms and modifications thereof as may reasonably be construed to fall within the spirit of the invention and the scope of the appended claims.

What is claimed is:

1. In a drill chuck assembly of the character set forth for overhead drilling operations, a rotatable spindle member having an elongated vertically disposed extension piece and being open through its top and bottom ends, a chuck member having a depending elongated shank portion received in the extension piece and being vertically slidable therein from a normal low position to a selected one of a plurality of elevated positions, means engaging the elongated shank with the extension piece for rotation with the latter as a unit, and manually releasable latch means mounted to the extension piece and engageable with a selected one of a plurality of vertically spaced slots in the shank for latching the latter in a selected elevated position, against further up or down movement until manually released.

2. In a drill chuck assembly as in claim 1, wherein the vertically spaced slots in the shank are square in cross section and are successively registrable with a complementary square slot formed in the extension piece, a key member is provided in the complementary slot of square cross section and is adapted to be moved partway out of the complementary slot into a selected slot of the shank then in register with the latter slot, and manually retractable spring means forming part of the latch means and disposed in abutment with the surface of the extension piece in opposed relation to the square slot of the latter is attached to the key member for drawing the key member in the complementary slot in a direction toward the registering slot of the shank.

3. In a drill chuck assembly of the character set forth for overhead drilling operations, a rotatable vertically disposed spindle member open through both ends, a chuck member having an elongated depending shank portion slidable in the spindle member and having a low position wherein the lower end of the shank projects from the bottom of the spindle and the chuck projects from the upper end thereof, the shank, having a straight splined engagement with the spindle for rotation as a unit with the latter and being slidable in the spindle to any of a plurality of elevated positions, the shank including a plurality of vertically spaced slots square in cross section, each successively registrable with a complementary slot square in cross section, in the surrounding wall of the spindle member, key means square in cross section in the complementary slot slidable to project partway from the latter into engagement with a registering slot of the shank, spring means carried by the spindle for rotation therewith constantly urging the key means radially inward whereby it is adapted to slidably engage in a registering slot and to lock the shank against further up or down movement, and the spring means being manually actuable in an opposite direction to withdraw the key means from the registering slot.

4. In a drill chuck assembly of the structure set forth for use in overhead drilling operations and adapted to be carried upon a lift carriage, a rotatable vertically disposed open ended spindle member, a chuck member for holding a boring tool and having an elongated depending shank portion slidable up and down in the open ended spindle member; a key piece formed internally of the spindle member and engaging a keyway lengthwise of the shank portion for guiding the shank portion in its sliding movement and for restraining the latter against free rotation in the spindle; the spindle member having a short vertical continuation of its upper end, the continuation being characterized by a transverse slot square in cross section through its periphery and a complementary key lug square in cross section successively registrable with the transportion having a plurality of vertically spaced slots square in cross section successively registerable with the transverse slot; a U-formed element having its arms freely extending about the spindle continuation and the free ends thereof engaging the ends of the key lug; a vertically disposed bow spring carrying the U element, the bow spring being fixed to the bridge end of the U element and tensioned at its ends against the surface of the spindle so as to draw the key lug inwardly of the transverse slot and to project a portion of the lug into engagement with a registering slot of the shank, whereby the latter is restrained against up or down movement; and the bow spring being manually depressable to free the key lug from the registering slot to enable further up or down movement of the shank piece, the spindle, the shank, and the key lug being rotatable together as a unit.

5. In a drill chuck assembly of the character described for use in overhead drilling operations, including a rotatable vertically disposed spindle member, a chuck member for holding an elongated boring tool and having a depending elongated shank engaged in the spindle member, wherein the chuck member is characterized by an inner member having a socket for reception of an end of the boring tool; an outer member surrounding the inner member and having its lower end fixed to the top of the said shank, the inner member having a truncated tapered lower and seatable in a complementary seat of the outer member; and by a plurality of short splines externally of the inner member loosely engaging relatively longer splines internally of the outer member, whereby the inner member is adapted upon being elevated slightly from its seat to be tilted slightly relative to the outer member, and wherein the splines of the inner member are spaced below the upper end of the outer member, and the outer member has fitted in its upper end a ring member blocking travel of the inner splines above the upper end of the outer member.

6. In a structure according to claim 5, wherein the inner member is spaced radially a slight distance from the outer member and this space communicates above the seat of the outer member with transverse openings in the outer member for discharge of dirt entering between the two members, and wherein a transverse opening through the outer member passes below and in communication with the said seat for discharge of any dirt accumulating below the latter.

7. In apparatus of the character described including a carriage support, a spindle head unit mounted to the carriage support and comprising a rotatable inner spindle member, a rotatable outer spindle member arranged coaxial with the inner spindle, a motor drive, gearing connecting the inner spindle for rotation by the motor drive, planetary gearing connecting the outer spindle with the inner spindle for rotation of the outer spindle together with the inner spindle but at a slower rate of speed; wherein the inner spindle has a chuck including an elongated shank vertically slidable in the inner spindle and engaged to the latter for rotation therewith, and manually operable latch means carried by the inner spindle for effecting adjustment of the shank relative to the inner spindle from a normal low position to a plurality of elevated positions, the outer spindle is vertically splined in its periphery, and a bolt setting tool having a cylindrical body open in its bottom and having internal splines at its bottom end freely sleeves over the chuck in the normal low position of the latter and is removably and slidably splined by said internal splines with the splines of the outer spindle, whereby upon removal of the bolt setting tool, the chuck is accessible for reception of a boring tool, and for adjustment of the shank of the chuck to an elevated position.

8. In apparatus of the character described including a lift carriage; a drill chuck assembly mounted upon the latter for overhead drilling operations, comprising a rotatable elongated and open ended vertical inner spindle, a rotatable outer spindle surrounding the lower end of the latter and having vertical straight splines in its periphery, a motor drive, gearing operatively connecting both spindles to the motor drive for rotation of both spindles at the same time and for rotation of the outer spindle at a slower rate of speed relative to the inner spindle, a drill chuck member having a depending elongated shank vertically slidable in the inner spindle from a normal low position wherein the bottom end of the shank projects through the bottom end of the inner spindle to a plurality of selective raised positions, manually releasable latch means carried by the inner spindle above the straight splines of the outer spindle for retaining the shank in a selected raised position and having an overall outer dimension less than that of the said splines, vertical key means slidably associating the shank with the inner spindle for guiding the shank in its vertical movement and for restraining the latter against rotation relative to the spindle, a removable bolt setting tool having an elongated cylindrical body open in its bottom end normally sleeving freely over the chuck member in the low position of the latter and over the latch means and having internal splines slidably engaging the straight splines of the outer spindle, whereby the bolt setting tool is rotatable with the outer spindle and, upon removal of the bolt setting tool, the chuck member is accessible for reception of a drill and the shank of the chuck member is adapted to be raised to a selected position and there retained by the latch means.

References Cited in the file of this patent
UNITED STATES PATENTS

| | | |
|---|---|---|
| 796,890 | Blackett | Aug. 8, 1905 |
| 1,041,792 | Hill | Oct. 22, 1912 |
| 1,156,088 | Lawson | Oct. 12, 1915 |

(Other references on following page)

UNITED STATES PATENTS

| | | |
|---|---|---|
| 2,151,673 | Acker | Mar. 28, 1939 |
| 2,250,670 | Joy | July 29, 1941 |
| 2,263,508 | Lee | Nov. 18, 1941 |
| 2,525,646 | Burg | Oct. 10, 1950 |
| 2,547,518 | Benjamin et al. | Apr. 3, 1951 |
| 2,673,452 | Glaze | Mar. 30, 1954 |
| 2,675,256 | Cornell | Apr. 13, 1954 |
| 2,709,572 | Ageborn | May 31, 1955 |
| 2,758,494 | Jenkins | Aug. 14, 1956 |